(12) United States Patent
Mase (10) Patent No.: US 8,478,259 B2
(45) Date of Patent: Jul. 2, 2013

(54) WIRELESS COMMUNICATION SYSTEM AND WIRELESS CONNECTION CONTROL METHOD

(75) Inventor: Atsushi Mase, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 291 days.

(21) Appl. No.: 12/719,915

(22) Filed: Mar. 9, 2010

(65) Prior Publication Data

US 2010/0234000 A1   Sep. 16, 2010

(30) Foreign Application Priority Data

Mar. 10, 2009 (JP) .................................. 2009-056758
Dec. 24, 2009 (JP) .................................. 2009-293373

(51) Int. Cl.
*H04M 11/00* (2006.01)
*H04W 4/00* (2009.01)
*H04W 24/00* (2009.01)
*H04W 68/00* (2009.01)

(52) U.S. Cl.
USPC ..................... 455/421; 455/435.1; 455/456.1; 455/458

(58) Field of Classification Search
USPC ................... 370/329; 455/414.1, 421, 435.1, 455/456.1, 458
See application file for complete search history.

(56) References Cited

U.S. PATENT DOCUMENTS

| 7,428,225 B2 * | 9/2008 | Uchida ......................... 370/329 |
| 2003/0093549 A1 * | 5/2003 | Akaogi .......................... 709/234 |
| 2003/0148760 A1 * | 8/2003 | Takayanagi ................... 455/420 |
| 2006/0111098 A1 * | 5/2006 | Abdel-Kader et al. ....... 455/421 |

FOREIGN PATENT DOCUMENTS

| JP | 9261168 A | 10/1997 |
| JP | 2005236611 A | 9/2005 |

OTHER PUBLICATIONS

Japanese Office Action issued in JP 2009-293373, dated Apr. 2, 2013 (in English).

* cited by examiner

*Primary Examiner* — Dwayne Bost
*Assistant Examiner* — Christopher Kohlman
(74) *Attorney, Agent, or Firm* — Bacon & Thomas, PLLC (57) ABSTRACT

A wireless communication system includes a plurality of mobile stations and a base station configured to connect the mobile stations wirelessly, wherein the base station includes a response request signal transmission module configured to transmit a response request signal to the mobile stations, and a first wireless connection control module configured to disconnect the wireless connection between the mobile stations when a response signal is not received from at least one of the mobile stations to which the response request signal has been transmitted.

16 Claims, 10 Drawing Sheets

[Communication link establishment phase in simplex individual communication]

[Communication link release phase upon detection of no communication by no-communication detection timer]

WIRELESS COMMUNICATION SYSTEM AND WIRELESS CONNECTION CONTROL METHOD

CROSS-REFERENCE TO RELATED APPLICATIONS

This application is based upon and claims the benefit of priority from prior Japanese Patent Applications No. 2009-056758, filed Mar. 10, 2009; and No. 2009-293373, filed Dec. 24, 2009, the entire contents of both of which are incorporated herein by reference.

BACKGROUND OF THE INVENTION

1. Field of the Invention

The present invention relates to a wireless communication system and a wireless connection control method, including a base station and a plurality of mobile stations and configured to perform wireless communications using simplex individual communications.

2. Description of the Related Art

Conventional wireless communication systems that perform wireless communications using simplex individual communications adopt the press-to-talk system, in which a press-to-talk button is pressed down in order to start communications (see Jpn. Pat. Appln KOKAI Publication No. 2005-236611, for example).

Further, simplex individual communication that employs the press-to-talk system in communication between mobile stations of a selective individual system via a base station is defined by "Municipal Digital Mobile Communication System, Standard, Association of Radio Industries and Businesses (ARIB) STD-T79".

In the above-described conventional simplex individual communication, a communication link between mobile stations is established via a base station. When the mobile station cannot be communicated with because the mobile station is out of range or has exhausted its battery after establishment of the communication link, however, the base station cannot recognize that the mobile station is out of range. Accordingly, the base station cannot release the communication link, even though simplex individual communications cannot be established in such a condition.

BRIEF SUMMARY OF THE INVENTION

It is an object of the present invention to provide a wireless communication system and a wireless connection control method capable of releasing an unnecessary communication link, effectively using a channel, and providing high reliability.

According to an aspect of the present invention, it is provided that a wireless communication system comprising a plurality of mobile stations and a base station configured to connect the mobile stations wirelessly, wherein the base station includes a response request signal transmission module configured to transmit a response request signal to the mobile stations; and a first wireless connection control module configured to disconnect the wireless connection between the mobile stations when a response signal is not received from at least one of the mobile stations to which the response request signal has been transmitted.

According to another aspect of the present invention, it is provided that A wireless connection control method used in a wireless communication system comprising a plurality of mobile stations and a base station configured to connect the mobile stations wirelessly, wherein the base station performs: transmitting a response request signal to the mobile stations; and disconnecting the wireless connection between the mobile stations when a response signal could not be received from at least one of the mobile stations to which the response request signal has been transmitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail with reference to the accompanying drawings.

Figure 1A:
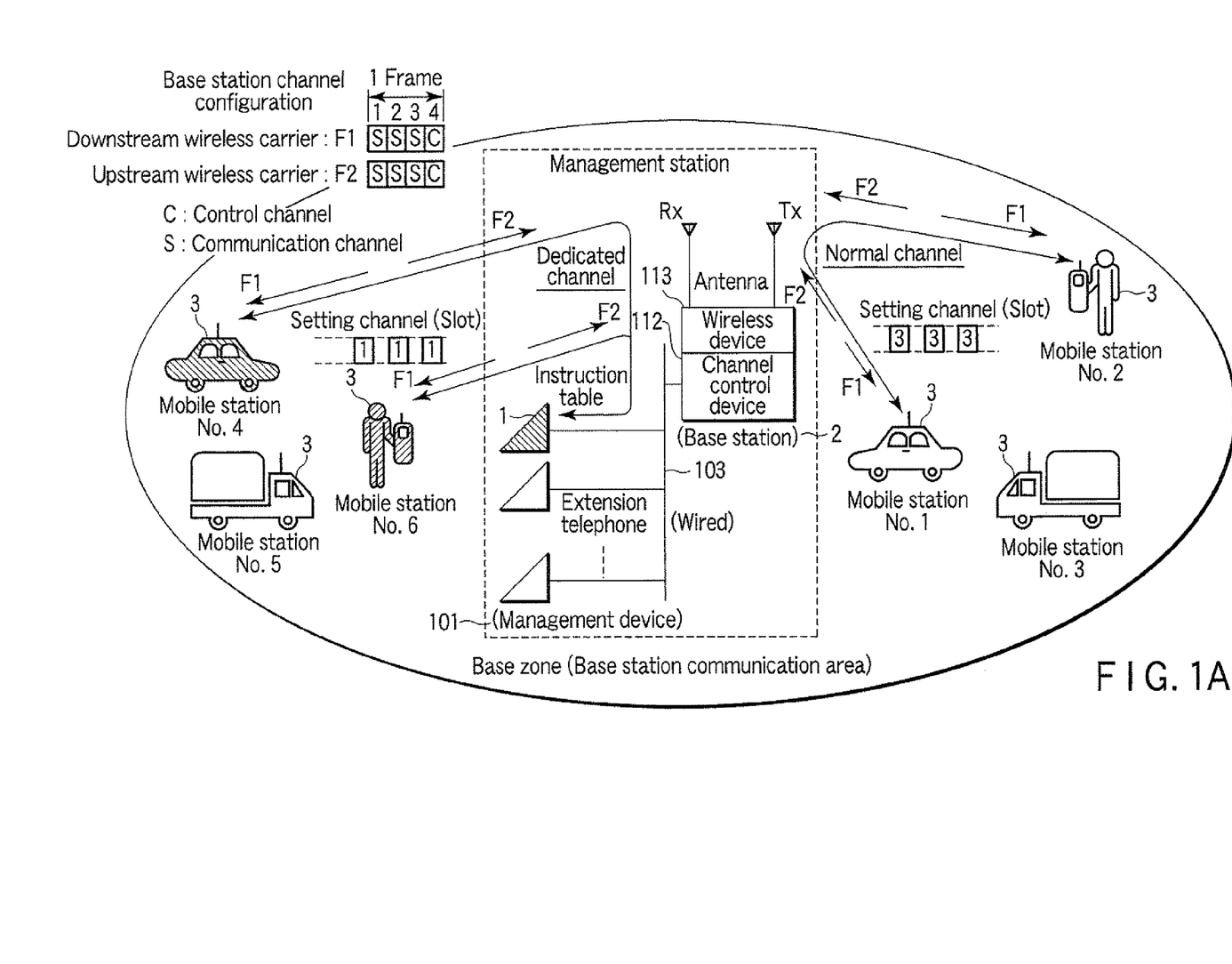
FIG. 1A shows a configuration of a wireless communication system according to an embodiment of the present invention.

FIG. 1A shows a configuration of a wireless communication system, in which a municipal digital mobile communication system, which is a digital wireless communication system using a time-division multiplex connection system, is adopted as an embodiment, according to an embodiment of the present invention.

The wireless communication system includes a base zone ((base station) communication area), in which a management station including a management device 101 (including an instruction table 1), a base station 2, and mobile stations 3 comprising a plurality of mobile wireless devices exist. Emergency notifications at the time of occurrence of a disaster, for example, are transmitted as instruction information emitted by the instruction table 1 and transmitted via the base station 2 to the mobile station 3.

The base station 2 includes an antenna, which performs wireless transmission and reception of radio-frequency waves to and from the mobile stations 3, a wireless device 113 configured to perform radio-frequency amplification, and a channel control device 112 configured to control wireless and wired lines.

The instruction table 1 is connected to the channel control device 112 via a wired line and is a device configured to perform an operation of arbitrarily specifying a mobile station 3 and inputting and outputting instruction audio. Further, an extension telephone, a communication table, or the like, may be connected via a wired line to the instruction table 1 and used as the other party of the communication.

Since the instruction table 1, the extension telephone, and the like (including the communication table) include the base station 2 connected via a wired line, they form a management station, which manages instruction information.

In the communication capable area of the base station 2, mobile terminal devices, which are a plurality of mobile wireless devices such as mobile devices and in-car devices, exist as mobile stations 3 (Nos. 1-6), and the mobile stations 3 and the management station form the base zone.

Figure 1B:
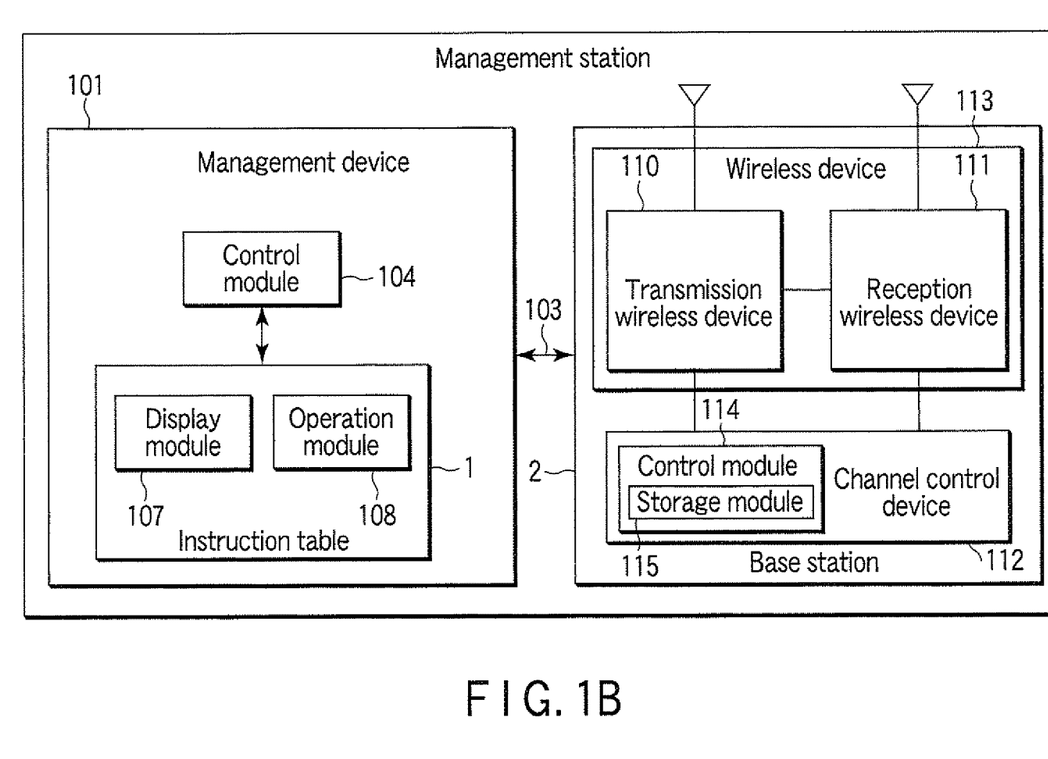
FIG. 1B is a block diagram illustrating a management station of FIG. 1A.

FIG. 1B is a block diagram illustrating a management station of an embodiment of the present invention. In FIG. 1B, the management station of the present embodiment includes the management device 101 and the base station 2. The management device 101 and the base station 2 are connected via a wired transmission channel 103. The management device 101 including the instruction table 1 and the base station 2 may be formed either integrally or separately. Usually, a plurality of base stations 2 are formed, but only one base station is represented in FIG. 1B in order to simplify the description.

The management device 101 includes a control module 104 and the instruction table 1, and the instruction table 1 includes a display module 107 and an operation module 108. The base station 2 includes a wireless device 113 which performs transmission and reception to and from the mobile stations 3, and a channel control device 112. Although not shown in FIG. 1B, the management device 101 (instruction table 1) and the wireless device 113 are connected via the channel control device 112. The channel control device 112, which is provided inside the base station 2 in FIG. 1B, may be provided apart from the base station 2. The channel control device 112 includes a control unit 114 and a storage module 115 and performs control such as establishment and release (disconnection) of a communication link.

The wireless device 113 includes a transmission wireless device 110 configured to transmit a signal from the base station 2 to the mobile station 3 via a wireless carrier F1, for example, and a reception wireless device 111 configured to receive a signal from the reception station 3 to the base station 2 via a wireless carrier F2, for example. The instruction table 1 maintains and manages the service area and communication connection between the base station 102 and one or more mobile stations 3 in the digital wireless system, and performs control, for example, so as to control an outgoing call from the mobile station 3 or set a communication route.

Figure 1C:
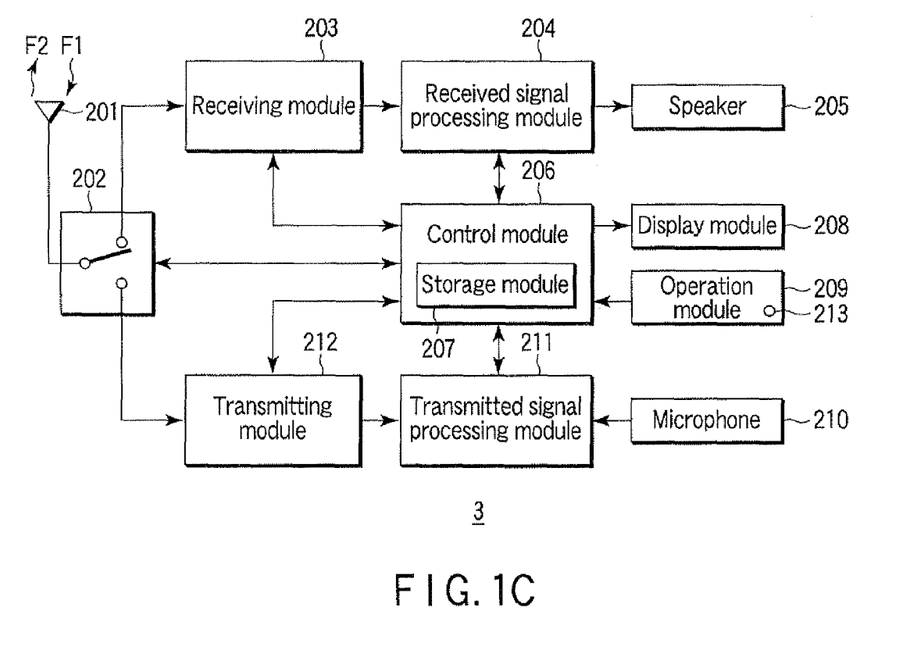
FIG. 1C is a block diagram illustrating a mobile station of FIG. 1A.

FIG. 1C is a block diagram illustrating a mobile station according to an embodiment of the present invention. The mobile station which will be described below refers to an in-car wireless device, a mobile wireless device, an information terminal station, or the like that is installed in a vehicle and the like. In FIG. 1C, the mobile station 3 is a wireless communication device capable of performing simultaneous transmission and reception using a pair of waves including an uplink wireless carrier F2 and a downlink wireless carrier F1. The mobile station 3 represents a plurality of mobile stations 3 (Mobile station No. 1, No. 2, . . . ).

In FIG. 1C, the mobile station 3 includes an antenna 201 configured to perform transmission and reception to and from the base station 2, and a switch 202 configured to switch transmission and reception. Further, the mobile station 3 includes a receiving module 203, a received signal processing module 204, and a speaker 205 as a reception system, and a microphone 210, a transmitted signal processing module 211, and a transmitting module 212 as a transmission system. Further, the mobile station 3 includes a control module 206 for controlling each module, a storage module 207, a display module 208, and an operation module 209. The operation module 209 is provided with a press-to-talk button 213. The control module 206 performs response control over a response request signal (which will be described later) transmitted from the base station 2 and control of the display module 208 based on a disconnection signal (which will be described later) and so on in addition to the usual calling control.

Referring back to FIG. 1A, a channel configuration used in a wireless communication line between the base station 2 and the mobile stations 3 will be described. A downlink wireless carrier (wireless frequency: F1) and an uplink wireless carrier (wireless frequency: F2) are allocated to a channel. Each of the mobile stations 3 shares the wireless frequencies F1 and F2.

In the descriptions that follow, TDMA timing of each carrier is configured to be 4 slots per 1 frame. In both of the wireless frequencies F1 and F2, the first to third slots are allocated to a communication channel (S or Sch), and the fourth slot is allocated to a control channel (C or Cch). Of the communication channels (S) of the first to third slots, the communication channel (S) of the first slot, for example, may be set as a dedicated channel, and the communication channels (S) of the second and third slots may be allocated as a usual channel which performs usual communications. Allocation of (S) and (C) of the four slots may be performed arbitrarily. In the above description, a time division multiplex access (TDMA) system has been described, but a single channel per carrier (SCPC) system, in which one carrier is allocated to one channel, may be adopted instead.

Next, a communication procedure of the wireless communication system with the above-described configuration will be described.

Figure 2:
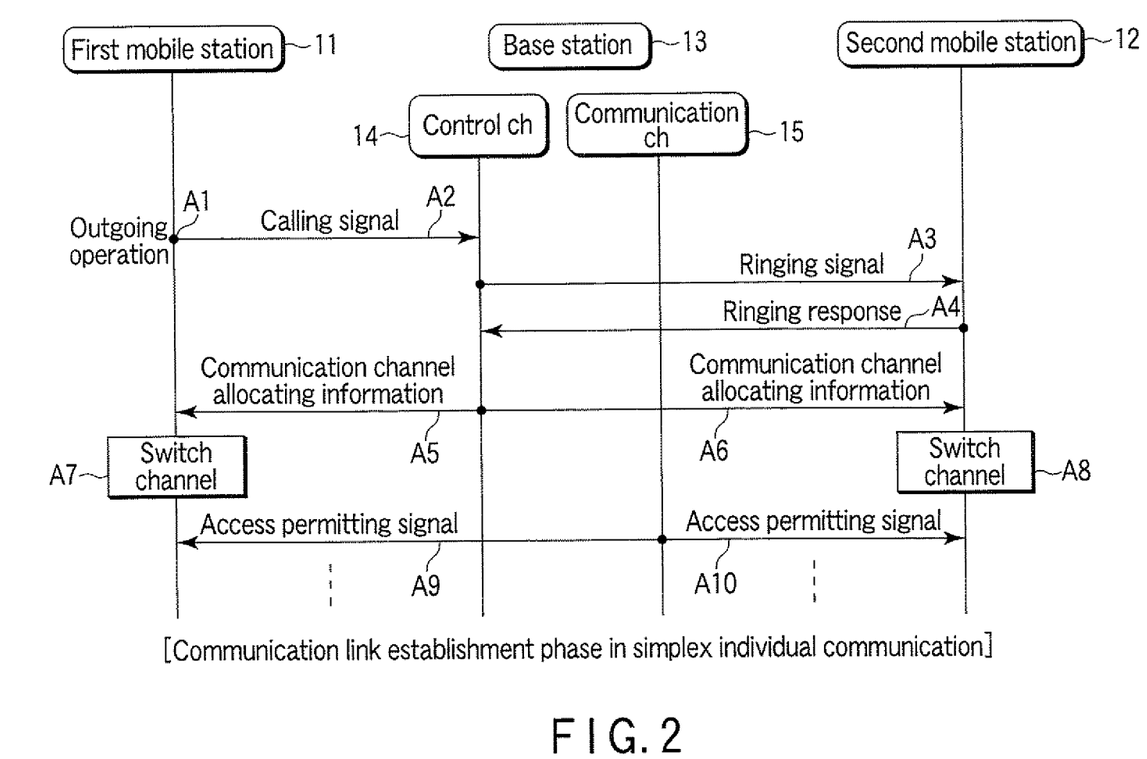
FIG. 2 illustrates a sequence of a communication link establishment phase in simplex individual communications.

FIG. 2 illustrates a sequence of a communication link establishment phase in simplex individual communications when wireless communications between the first mobile station 11 and the second mobile station 12 are relayed by the base station 13, which is a higher-level device, for example, in a wireless communication system formed of a base station and a plurality of mobile stations and performs wireless communications via simplex individual communications between the mobile stations via the base station. Wireless communications between the base station 13 and the mobile stations 11, 12 are performed via a control channel (ch) 14 and a communication channel (ch) 15.

First, in the first mobile station 11 which starts simplex individual communications, the user specifies an individual number of the other party of the communication and performs an outgoing operation (step A1). When the outgoing operation is performed, the first mobile station 11 transmits a calling signal to the base station 13 via the control channel 14 (step A2). Upon receipt of the calling signal, the base station 13 calls the second mobile station 12, which is the other party of the communication, via the control channel 14, and transmits a signal (step A3). Upon receipt of the calling signal from the base station 13, the second mobile station 12 transmits a ringing response signal to the base station 13 (step A4).

Upon receipt of the ringing response signal from the second mobile station 12, the base station 13 allocates a communication channel 15 for the simplex individual communications of this time, and transmits communication channel allocating information to the first mobile station 11 and the second mobile station 12 (steps A5, A6). Upon receipt of the communication channel allocating information from the base station 13, the first mobile station 11 and the second mobile station 12 switch the channel to the specified communication channel 15 (steps A7 and A8). Since the base station 13 has transmitted an access permitting signal via the allocated communication channel 15 (steps A9 and A10), the mobile stations 11, 12 are set in an access permitted state upon receipt of an access permitting signal from the base station 3 via the communication channel 15 after switching of the channel.

With the above-described procedures, a communication link is established. The user is notified of the establishment of the communication link by way of sound, for example.

Figure 3:
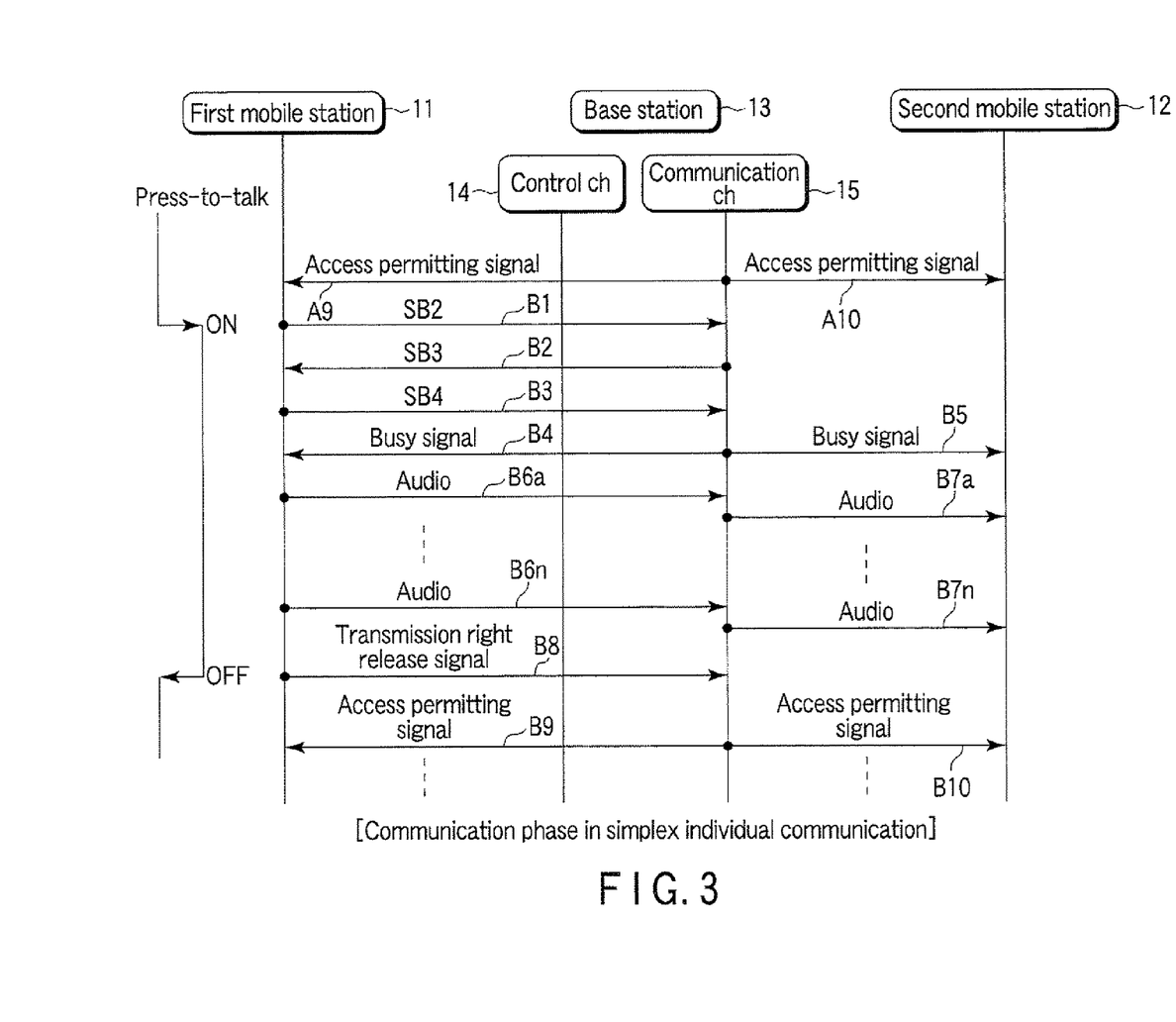
FIG. 3 illustrates a sequence of a communication phase in simplex individual communications.

FIG. 3 illustrates a sequence of a communication phase after establishment of a communication link. Simplex individual communication adopts the press-to-talk system as a communication form. When an access permitting signal is transmitted from the base station 3 via the communication channel 15 according to the sequence shown in FIG. 2 and the communication link is established (steps A9 and A10), the user on the side of the first mobile station 11, which starts communications, presses down a press-to-talk button prior to communications.

When the press-to-talk button is turned ON, the first mobile station 11 transmits and receives the synchronizing burst signal (SB2-SB4) to and from the base station 13 (steps B1-B3) and acquires a transmission right. That is, the first mobile station 11 transmits a synchronization burst signal (SB2) for making a request to acquire a transmission right to the base station 13 (step B1). In response to this, the base station 13 transmits a synchronization burst signal (SB3) for giving a transmission right to the first mobile station 11 (step B2). When the first mobile station 11 normally receives the synchronization burst signal (SB3) for giving a transmission right from the base station 13, the first mobile station 11 transmits a synchronization burst signal (SB4) to the base station 13 (step B3). Thereby, the base station 13 transmits a busy signal to the first mobile station 11 and the second mobile station 12 (steps B4, B5), so as to set them in an audio transmission state.

Upon acquisition of the transmission right, the first mobile station 11 notifies the user of the acquisition of the transmission right by way of sound, for example. The first mobile station 11 transmits an audio signal input by the user via a microphone, for example, to the base station 13 (steps B6a-B6n). The base station 13 causes the audio data from the first mobile station 11 to be transferred downlink, and is transmitted to the second mobile station 12 (steps B7a-B7n). Upon receipt of the audio data, the second mobile station 12 plays back the audio.

In order to end communications between the mobile stations 11, 12, the user operates the press-to-talk button OFF on the side of the first mobile station 11, the outgoing call side. When the press-to-talk button is turned OFF, the first mobile station 11 transmits a transmission right release signal, instead of the audio signal, to the base station 13 (step B8). Upon receipt of the transmission right release signal, the base station 13 stops transfer of the audio data and transmits an access permitting signal to the first mobile station 11 and the second mobile station 12 (steps B9, B10). Upon receipt of the access permitting signal, the first mobile station 11 and the second mobile station 12 are set in an access permitting state.

Figure 4:
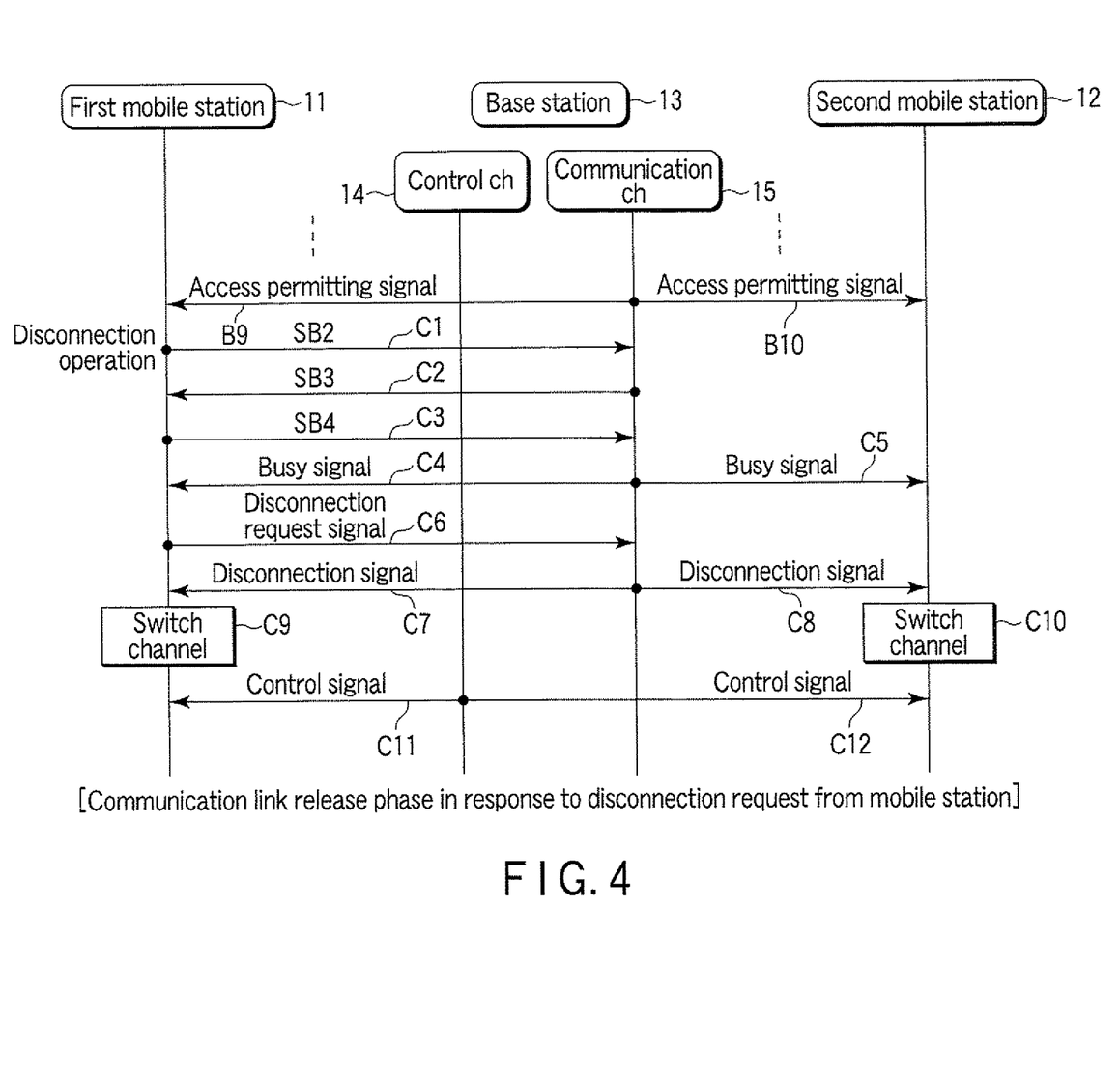
FIG. 4 illustrates a sequence of a communication link release phase upon receipt of a disconnection request from a mobile station in simplex individual communications.

FIG. 4 shows a sequence of a communication link release phase in a disconnection operation by the first mobile station 11. When the press-to-talk button is turned OFF and the disconnection operation is performed, the first mobile station 11 transmits and receives the synchronization burst signal (SB2-SB4) to and from the base station 13 (steps C1-C3), as in the case of the start of the communications shown in FIG. 3, and acquires a transmission right. In this case, the base station 13 transmits a busy signal to the first mobile station 11 and the second mobile station 12 (steps C4, C5). The first mobile station 11 acquires the transmission right and then transmits the disconnection request signal to the base station 13 (step C6). Upon receipt of the disconnection request signal, the base station 13 transmits a disconnection signal to the mobile stations 11, 12 (steps C7, C8) and releases the communication channel 15 being used. Upon receipt of the disconnection signal, the first mobile station 11 and the second mobile station 12 switch channel to control channel 14 (steps C9, C10) and start reception of the control signal (steps C11, C12).

Figure 5:
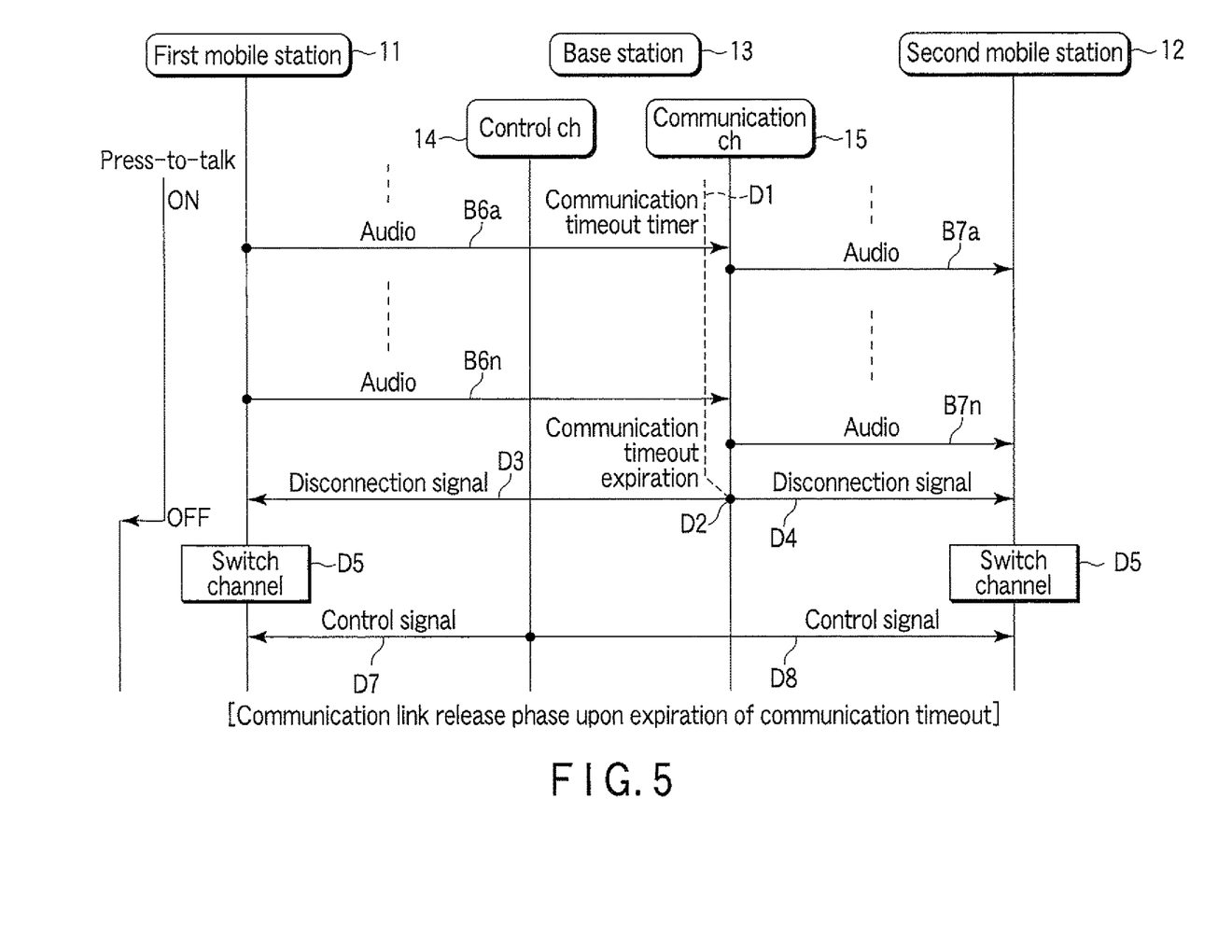
FIG. 5 illustrates a sequence of a communication link release phase upon expiration of a communication timeout period in simplex individual communications.

FIG. 5 shows a sequence of a communication link release phase according to communication timeout. The communication timeout is a restriction of communication time arbitrarily determined in each system. The base station 13 activates a communication timeout timer when a communication link is established by the sequence shown in FIG. 2 (step D1). While the communication timeout timer is being operated, the first mobile station 11 performs a transmission right acquisition process by the sequence of the communication phase shown in FIG. 3, and starts transmission of an audio signal to the base station 13 (steps B6a-B6n). The base station 13 causes the audio data from the first mobile station 11 to transfer to downlink communications such that the audio data is transmitted to the second mobile station 12 (steps B7a-B7n).

When the communication period of the timer has expired (step D2), the base station 13 transmits the disconnection signal to the first mobile station 11 and the second mobile station 12 even during communication (steps D3, D4), and releases the communication channel 15 being used. Upon receipt of the disconnection signal, the mobile stations 11, 12 switch channel to control channel 14 (steps D5, D6), and start receiving the control signal (D7, D8). Upon receipt of the disconnection signal, the first mobile station 11 notifies the user of release of the communication link by way of sound, for example, and the user operates the press-to-talk button OFF.

Figure 6:
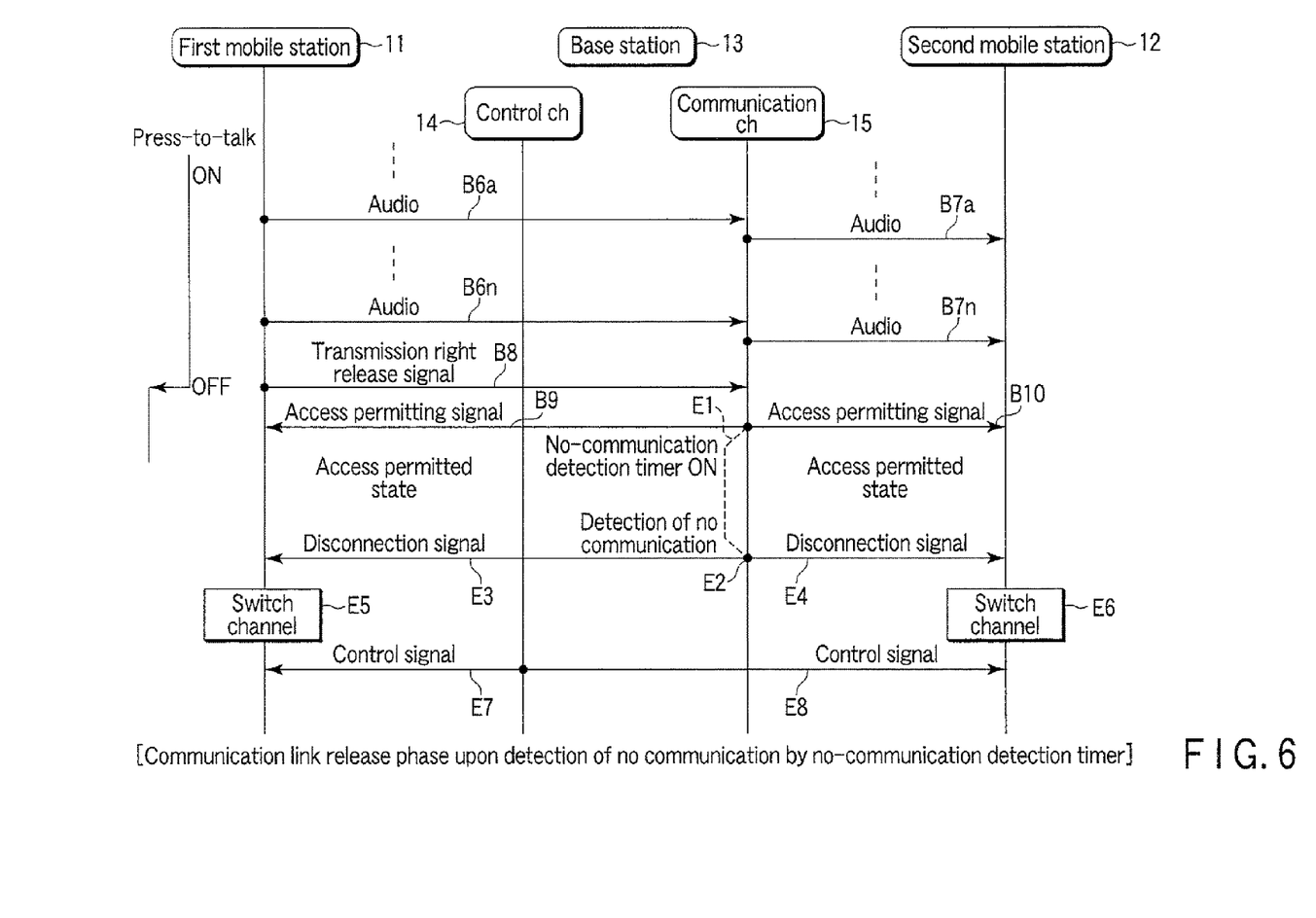
FIG. 6 illustrates a sequence of a communication link release phase upon detection of no communications by a no-communication detection timer in simplex individual communications.

FIG. 6 illustrates a sequence of a communication link release phase upon detection of no communication. The communication link release upon detection of no communications is a process of releasing the communication channel 15, which is different from the release of the communication link according to communication timeout, when there are no communications from the mobile stations for a predetermined period of time.

The first mobile station 11 transmits a transmission right release signal to the base station 13 in order to end communications by turning the press-to-talk button OFF in the sequence of the communication phase shown in FIG. 3 (step B8). Upon receipt of the transmission right release signal from the first mobile station 11, the base station 13 transmits an access permitting signal to the first mobile station 11 and the second mobile station 12 (steps B9, B10). In this case, the base station 13 activates a no-communication detection timer (step E1), and when there is no communication from the first mobile station 11 for a predetermined period of time and the no-communication detection timer has timed out and detected no communication, the base station 13 transmits a disconnection signal to the mobile stations 11, 12 (steps E3, E4) and releases the communication channel being used. Upon receipt of the disconnection signal, the mobile stations 11, 12 switch channel to control channel 14 (steps E5 E6), and start receiving a control signal (E7, E8) (step E2).

In this case, when at least one of the mobile stations in which a communication link has been established, has become out of range or exhausted its battery, the communication link should desirably be released immediately. Since the communication link is released by the above-described communication timeout or no-communication detection, occupation by a useless communication link can be suppressed by setting these periods short. However, when the period for the communication timeout timer and the no-communication detection timer to no-communication detection is reduced, compulsory release of the communication link and disconnection of the communication occur, even when the device is used in a normal state. Thereby, the device becomes inconvenient.

The embodiment is therefore configured to release a communication link immediately when a mobile station cannot be communicated with, according to the following sequence.

Figure 7:
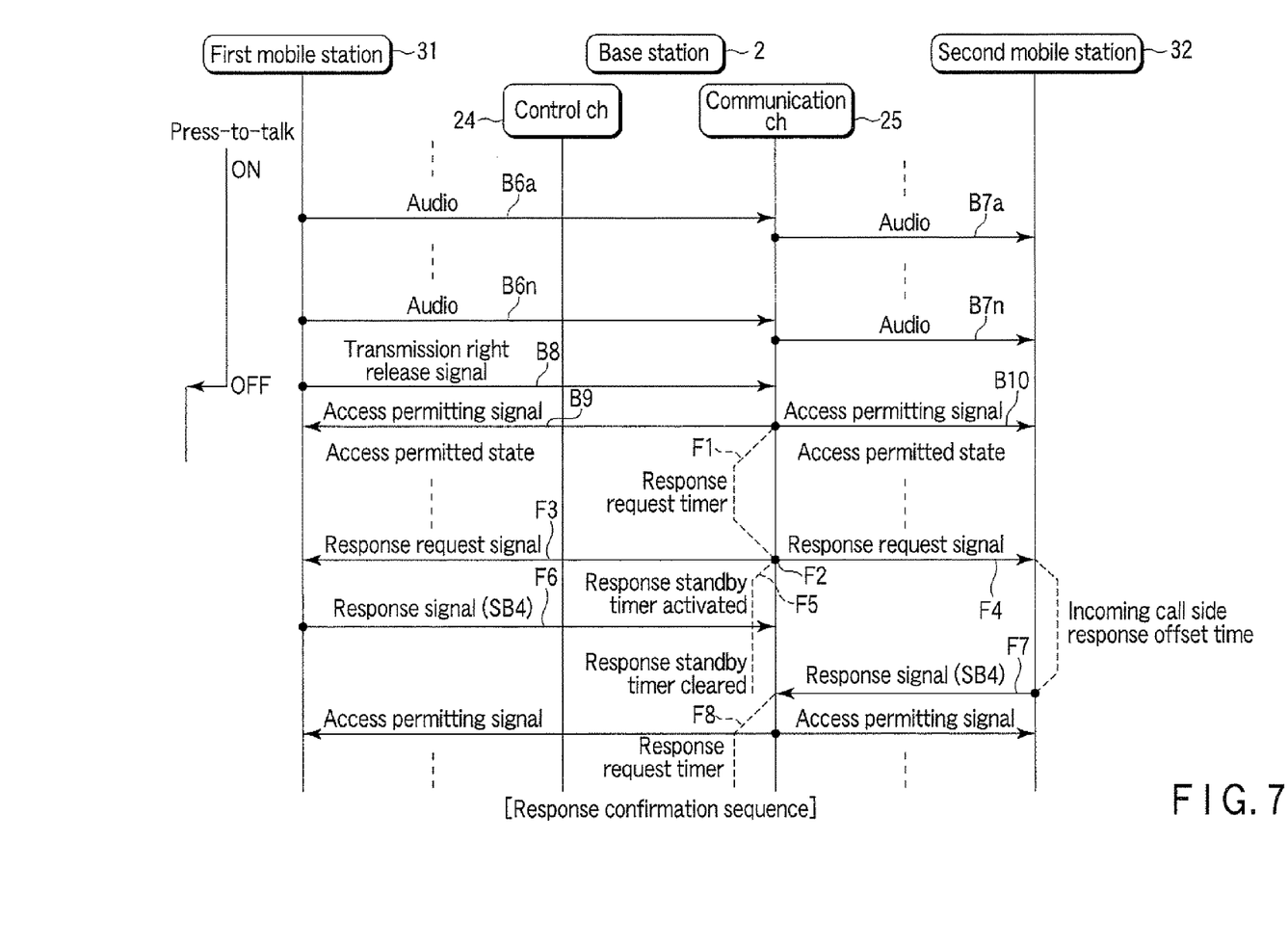
FIG. 7 illustrates a response confirmation sequence of the system shown in FIG. 1.

FIG. 7 shows a response confirmation sequence of a mobile station in simplex individual communication in a case where wireless communications between the first mobile station 31 and the second mobile station 32 are relayed by the base station 2. When the sequence of the communication link establishment phase and the communication phase has ended, the response confirmation process is performed.

Figure 8:
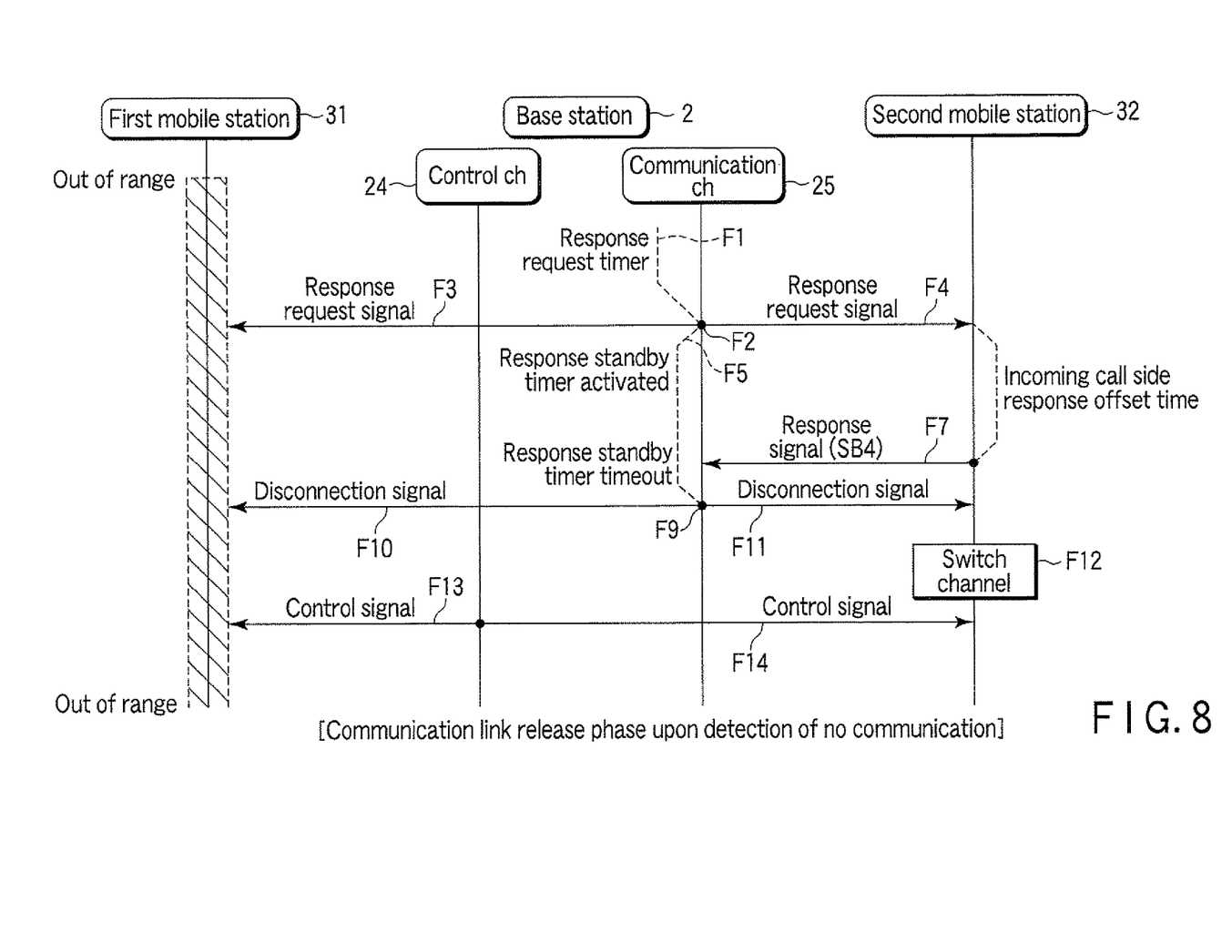
FIG. 8 illustrates a sequence of a communication link release phase upon detection of no communications in the system shown in FIG. 1.

FIG. 8 is a sequence of a communication link release phase in a case where the base station 2 has detected no communications of the first mobile station 31 and the second mobile station 32 in the response confirmation sequence of the mobile station shown in FIG. 7.

In this wireless communication system, the base station 2 transmits a response request signal requesting a response to the first mobile station 31 and the second mobile station 32 after establishment of a communication link in simplex individual communications. The first mobile station 31 and the second mobile station 32 transmit a response signal to the base station 2 upon receipt of the response request signal from the base station 2. The base station 2 judges a no-communication state, i.e., judges that simplex individual communication is not established when at least one mobile station does not make a response signal in a predetermined period of time, and releases a communication link between the first mobile station 31 and the second mobile station 32.

Hereinafter, the response confirmation sequence of the mobile stations 31, 32 and the sequence of the communication link release phase will be described in detail with reference to FIGS. 7 and 8.

When the press-to-talk button 213 is turned ON by the user after the establishment of the communication link to the second mobile station 2 via the base station 2, the first mobile station 31 transmits and receives a synchronization burst signal (SB2-SB4) to and from the second mobile station 32 so as to acquire a transmission right. Upon acquisition of the transmission right, the first mobile station 31 transmits an audio signal input via the microphone 210 by the user to the base station 13, as shown in FIG. 7 (steps B6a-B6n). The channel control device 112 of the base station 2 causes the audio data from the first mobile station 31 to be transferred downlink to the second mobile station 32 (step B7a-B7n). Upon receipt of the audio data, the second mobile station 32 outputs the audio from the speaker 205.

In order to end communications between the mobile stations 31 and 32, the user turns the press-to-talk button 213 OFF from the first mobile station 31 on the outgoing call side. When the press-to-talk button 213 is turned OFF, the first mobile station 31 transmits a transmission right release signal to the base station 2 instead of the audio signal (step B8). Upon receipt of the transmission right release signal, the base station 2 stops causing the audio data to be carried in the downlink communications and transmits an access permitting signal to the first mobile station 31 and the second mobile station 32 (steps B9, B10). In this case, the channel control device 112 activates a response request timer (step F1). That is, the base station 2 activates a response request timer when communications between the mobile stations have ended. The period of the response request timer (second predetermined period), or more preferably, the sum of the period of the response request timer and the period of the response standby timer (third predetermined period), which will be described later, is set shorter than the time of the communication timeout timer and the no-communication detection timer (first predetermined period). By making the release of the communication link, which is caused by incapability of communication, earlier than the timeout, which is caused by no communications, the communication channel can be used more efficiently.

When the response request timer has timed out and the next communication is not performed after the channel control device 112 has activated the response request timer (step F2), the channel control device 112 transmits a response request signal to the first mobile station 31 and the second mobile station 32 (steps F3, F4). The channel control device 112 activates a response standby timer upon transmittance of the response request signal (step F5), and when the channel control device 112 receives a response signal (SB4) from the mobile stations 31, 32 within the standby time (steps F6, F7), the response standby timer is cleared and the response request timer is activated again (step F8), and the response confirmation sequence is repeatedly performed. In the storage module 115 of the base station 2, the period of each of the communication timeout timer, the no-communication detection timer, the response request timer, and the response standby timer are stored.

In order to avoid collision of the response signal transmitted by the first mobile station 31 (mobile station on the outgoing call side) and the response signal transmitted by the second mobile station (mobile station on the incoming call side), the second mobile station 32, which has received the response request signal, transmits a response signal after a delay of a predetermined time (shown as an incoming call side response offset time in the drawing) after receiving the response request signal. The offset time may be set on the outgoing call side.

When a response signal from the mobile stations 31 32 cannot be received within the standby time and the response request timer has time out, as shown in FIG. 8, i.e., when the first mobile station 31 has moved out of range and the response request timer has timeout without receiving a response signal from the first mobile station 31 (step F9), the channel control device 112 transmits a disconnection signal to the mobile stations 31, 32 (steps F10, F11), and releases a communication link. In this case, the channel control device 112 transmits a disconnection signal after adding information disconnected due to abnormality of the response confirmation to the disconnection signal thereto. The second mobile station 32 displays disconnection of the communication link due to abnormality of the response confirmation on the display module 208 based on the information added to the disconnection signal. Thereby, it is possible to notify the user of the second mobile station 32 of the possibility that communication from the second mobile station 32 may not have been reached since the first mobile station 31, which is the other party of the communication, is in a communication-disabled condition.

Upon receipt of the disconnection signal, the second mobile station 32 switches the channel to the control channel 24 (step F12). The base station 2 releases the communication link and then starts transmission of a control signal to the first mobile station 31 and the second mobile station 32 via the control channel 24 (step F13, F14). Thus, a response request signal is periodically transmitted to the mobile stations 31, 32 from the base station 2 during simplex individual communications (steps F1-F3), and the mobile stations 31, 32 transmit a response signal to the base station 2 upon receipt of a response request signal (steps F6, F7). The base station 2 confirms that a communication link is maintained by receiving a response signal from both of the mobile stations 31, 32 (step F8), and releases a communication link when a response signal cannot be received from at least one of the mobile stations (steps F9-F11).

In order to prevent the response confirmation process affecting normal communications, the response signal is made a synchronization burst signal. In order to perform data transmission from the mobile station 3, a synchronization burst signal (SB2-SB4) needs to be transmitted and received (steps C1-C3) prior to data transmission, as in the case of transmitting a disconnection request signal from the first mobile station 11, as shown in FIG. 4, and this procedure requires time. By making the response signal a synchronization burst signal, however, the amount of time can be shortened. Further, by making the response signal a synchronization burst signal (SB4), the channel control device 112 can distinguish between a response signal and a synchronization burst signal (SB2) for requesting a transmission right for starting usual communications. Thereby, the base station 2 can shift to usual communications after receiving a burst signal (SB2) even while the base station 2 is waiting for a response signal.

The synchronization signals SB2 and SB4 are "initial synchronization burst" and "complete synchronization burst", respectively, defined in ARIB STD-T79. Since the burst synchronization bits included in the signal formats are different, the channel control device 112 can distinguish between the two.

Further, when usual communications are performed, the mobile station 3 performs transmission in the order of "SB2" and "SB4". Accordingly, the channel control device 12 can judge whether the mobile station 3 is to perform usual communications, i.e., has responded to a response signal, based on whether the synchronization burst received for the first time after transmission of a response request signal is "SB2" or "SB4".

That is, in the above-described embodiment, a response request signal is transmitted in a relatively short period (time period shorter than the communication timeout period timer and the no-communication detection timer) from a base station to a mobile station in simplex individual communications, and the mobile station which has received a response request signal adds a response confirmation sequence for transmitting a response signal to the base station. The base station releases a communication link without waiting for no-communication detection by the communication timeout timer or no-communication detection timer when one or both of the mobile stations that perform wireless communications has become out of range, for example, and the simplex individual communications cannot be established.

By thus reducing the time period during which the communication channel is used in vain as a system, a channel can be effectively used. Further, since the communication link is disconnected when the other party of the communication cannot be communicated with in simplex individual communication, communication to the other party that is incapable of performing communications is not performed. Thereby, reliability in simplex individual communication is improved and the device becomes more convenient.

(First Embodiment)

As the first embodiment, the approach in which the base station 2 confirms a response signal will be described. The mobile station 3 stores an identifier (ID) for individually identifying the mobile station 3 in a storage module 207. In order to transmit a response signal from the mobile station 3 to the base station 2, the control module 206 causes the transmission module 212 to transmit the response signal by adding the stored ID in the synchronization burst signal as a response signal. The base station 2 recognizes that there is a response signal from each of the mobile stations 31 and 32 based on the ID in the synchronization burst signal. Thereby, the control module 14 of the channel control device 112 identifies the mobile station that is in a communication-disabled condition.

Further, since the reason for release of the communication link is clarified by notifying the user of the mobile station in a communication-disabled condition, user-friendliness is improved. The control module 114 of the channel control device 112 transmits a disconnection signal containing information about the mobile station that could not receive a response signal from the transmission wireless device 110. Upon receipt of the disconnection signal, the mobile station 3 identifies a mobile station that is in a communication-disabled condition based on information of the mobile station contained in the disconnection signal and displays information indicating that the mobile station is in a communication-disabled condition on the display module 208.

(Second Embodiment)

As the second embodiment, a method for avoiding collision of response signals by staggering the timing of transmission of a response signal from the mobile station 3 is presented. For example, the storage module 207 of the mobile station 3 stores information indicating an outgoing call side response offset time (first response signal transmission timing) and an incoming call side response offset time (second response signal transmission timing). Upon receipt of the response request signal from the base station 2, the control module 206 controls the transmission module 212 to transmit a response signal after elapse of the outgoing call side response offset time, when the control module 206 is the outgoing call side, and after elapse of the incoming call side response offset time when the control module 206 is the incoming call side. By providing the outgoing call side response offset time and the incoming call side response offset time and staggering the timing of transmission of the response signal from the mobile stations 31, 32, collision of response signals of the incoming call side and the outgoing call side is avoided. The base station 2 can reliably receive a response signal from the two mobile stations 31, 32. Both of the outgoing call side response offset time and the incoming call side response offset time do not necessarily need to be set. The offset time may be set only on the side on which a response should be delayed.

Further, by using the outgoing call side response offset time and the incoming call side response offset time, the mobile station in a communication-disabled condition can be identified. The base station 2 causes the storage module 115 to store information indicating the outgoing call side response offset time and the incoming call side response offset time in advance. The control module 114 of the channel control device 112 measures a standby time from transmittance of a response request signal to the mobile stations 31, 32 to reception of the response signal. The control module 114 compares the measured response time and the stored outgoing call side response offset time and the incoming call side response offset time and identifies the mobile station that has received a response signal.

Further, as in the case of the first embodiment, the control module 114 of the channel control device 112 transmits a disconnection signal containing information about the mobile station that could not receive a response signal from the transmission wireless device 110 upon disconnection of wireless connection. Upon receipt of a disconnection signal, the control module 206 of the mobile station 3 identifies a mobile station that is in a communication-disabled condition, based on information about the mobile station contained in the disconnection signal, and displays information indicating that the mobile station is in a communication-disabled condition on the display module 208. Thus, since the mobile station that is in a communication-disabled condition is identified and the user is notified of the reason for release of the communication link, convenience can be further improved.

(Third Embodiment)

In the third embodiment, the mobile station 3 notifies the user that the mobile station 3 is in a communication-disabled condition. Thereby, user-friendliness is further improved. The storage module 207 of the mobile station 3 stores a response request signal standby period. The response request signal standby period is set to be the same as or longer than the period of the above-described response request timer. When the control module 206 does not receive a response request signal from the base station 2 in the response request signal standby period in a state in which the transmission module 212 does not perform transmission or reception from the other party, the control module 206 judges that the mobile station 3 is in a communication-disabled condition and displays the communication-disabled condition due to a reason caused by the mobile station 3 itself (e.g., the mobile station 3 has moved out of the communication range) on the display module 208.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication system comprising:
a plurality of mobile stations and a base station configured to connect the mobile stations wirelessly,
wherein the base station includes:
a response request signal transmission module configured to transmit a response request signal to each of the mobile stations, which are connected wirelessly to each other via the base station, wherein the response request signal is transmitted during a period when there is no communication by the users of the mobile stations; and
a first wireless connection control module configured to disconnect the wireless connection between the mobile stations when a response signal is not received from at least one of the mobile stations to which the response request signal has been transmitted; and
a second wireless connection control module configured to disconnect the wireless connection between the mobile stations when communication between the mobile stations that are connected wirelessly is not performed for a first predetermined period of time,
wherein the response request signal transmission module transmits the response request signal when communication between the mobile stations is not performed for a second period of time, the second period of time being shorter than the first period of time,
wherein the first wireless connection control module transmits a disconnection signal upon disconnection of the wireless connection, and
wherein the mobile station further comprises a notification module configured to notify a user that a mobile station that is other party of communication is in a communication-disabled condition, upon receipt of the disconnection signal.

2. The system according to claim 1, wherein the mobile station further includes:
a storage unit configured to store data indicating a first response signal transmission timing used when the mobile station is on an outgoing call side and a second response transmission timing used when the mobile station is on an incoming call side; and
a response signal transmission module configured to transmit the response signal using the first response signal transmission timing when the mobile station is on the outgoing call side and the second response transmission timing when the mobile station is on the incoming call side.

3. The system according to claim 2, wherein the first wireless connection control module stores a first standby period corresponding to the first response signal transmission timing and a second standby period corresponding to the second response signal transmission timing, and identifies a mobile station from which the response signal has been received based on a timing in which the response signal has been received.

4. The system according to claim 3, wherein the first wireless connection control module transmits a disconnection signal including information of the mobile station from which the response signal could not be received upon disconnection of the wireless connection, and
the mobile station includes a notification module configured to identify a mobile station that is in a communication-disabled condition based on information about the mobile station included in the disconnection signal and notify a user that the mobile station is in a communication-disabled condition.

5. The system according to claim 1, wherein the mobile station further includes:
a storage unit configured to store an identifier (ID) of the mobile station; and
a response signal transmission module configured to transmit a response signal including the ID upon receipt of the response request signal; and
the first wireless connection control module identifies a mobile station from which the response signal has been received based on the ID included in the received response signal.

6. The system according to claim 5, wherein
the first wireless connection control module transmits a disconnection signal including information about a mobile station from which the response signal could not be received upon disconnection of the wireless connection, and
the mobile station includes a notification module configured to identify a mobile station that is in a communication-disabled condition based on information about the mobile station included in the disconnection signal and notify a user that the mobile station is in a communication-disabled condition.

7. The system according to claim 1, wherein
the response request signal transmission module transmits the response request signal when communications between the mobile stations are not performed for a predetermined period of time, and
the mobile station further includes a notification module configured to notify a user that the mobile station is in a communication-disabled condition when the response request signal is not received although communication with a mobile station that is other party of the communication is not performed for a period of time corresponding to the predetermined time.

8. The system according to claim 1, wherein
the first wireless connection control module disconnects the wireless connection between the mobile stations when a response signal is not received from at least one of the mobile stations to which the response request signal has been transmitted after elapse of a third predetermined period of time from transmittance of the response request signal, the sum of the second predetermined period of time and the third predetermined period of time being set shorter than the first predetermined period of time.

9. A wireless connection control method used in a wireless communication system comprising a plurality of mobile stations and a base station configured to connect the mobile stations wirelessly, wherein the base station performs the steps of:
transmitting a response request signal to each of the mobile stations, which are connected wirelessly to each other via the base station, wherein the response request signal is transmitted during a period when there is no communication by the users of the mobile stations; and
disconnecting the wireless connection between the mobile stations when a response signal could not be received from at least one of the mobile stations to which the response request signal has been transmitted,
disconnecting the wireless connection between the mobile stations when communication between the mobile stations that are connected wirelessly is not performed for a first predetermined period of time, and
transmitting the response request signal when communication between the mobile stations is not performed for a second period of time, the second period of time being shorter than the first period of time
wherein the base station performs transmitting a disconnection signal upon disconnection of the wireless connection, and
wherein the mobile station performs notifying a user that a mobile station that is other party of communication is in a communication-disabled condition, upon receipt of the disconnection signal.

10. The method according to claim 9, wherein the mobile station performs:
storing data indicating a first response signal transmission timing used when the mobile station is on an outgoing call side and a second response transmission timing used when the mobile station is on an incoming call side; and
transmitting the response signal using the first response signal transmission timing when the mobile station is on the outgoing call side and the second response transmission timing when the mobile station is on the incoming call side.

11. The method according to claim 10, wherein the base station performs:
storing a first standby period corresponding to the first response signal transmission timing and a second standby period corresponding to the second response signal transmission timing; and
identifying a mobile station from which the response signal has been received based on a timing in which the response signal has been received.

12. The method according to claim 11, wherein the base station performs transmitting a disconnection signal including information about the mobile station from which the response signal could not be received upon disconnection of the wireless connection, and
the mobile station performs identifying a mobile station that is in a communication-disabled condition based on the information about the mobile station included in the disconnection signal and notifying a user that the mobile station is in a communication-disabled condition.

13. The method according to claim 9, wherein
the mobile station performs storing an identifier (ID) of the mobile station and transmitting a response signal including the 1D upon receipt of the response request signal, and
the base station performs identifying a mobile station from which the response signal has been received based on the 1D included in the received response signal.

14. The method according to claim 13, wherein
the base station performs transmitting a disconnection signal including information about a mobile station from which the response signal could not be received upon disconnection of the wireless connection, and
the mobile station performs identifying a mobile station that is in a communication-disabled condition based on the information about the mobile station included in the disconnection signal and notifying a user that the mobile station is in a communication-disabled condition.

15. The method according to claim 9, wherein
the base station transmits the response request signal when communication between the mobile stations is not performed for a predetermined period of time, and
the mobile station notifies a user that the mobile station is in a communication-disabled condition when the response request signal is not received although communication with a mobile station that is other party of the communications is not performed for a period of time corresponding to the predetermined time.

16. The method according to claim 9, wherein
the base station performs disconnecting the wireless connection between the mobile stations when a response signal could not be received from at least one of the mobile stations to which the response request signal has been transmitted, after elapse of a third predetermined period of time from transmittance of the response request signal, a sum of the second predetermined period of time and the third predetermined period of time being set shorter than the first predetermined period of time.

* * * * *